W. A. McELNEY.
CHEESE CUTTER.
APPLICATION FILED NOV. 8, 1907.
908,878.
Patented Jan. 5, 1909.
2 SHEETS—SHEET 1.
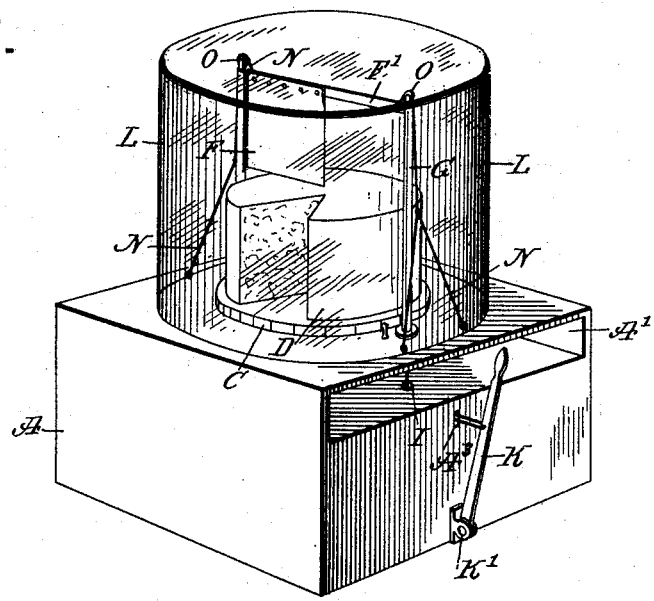
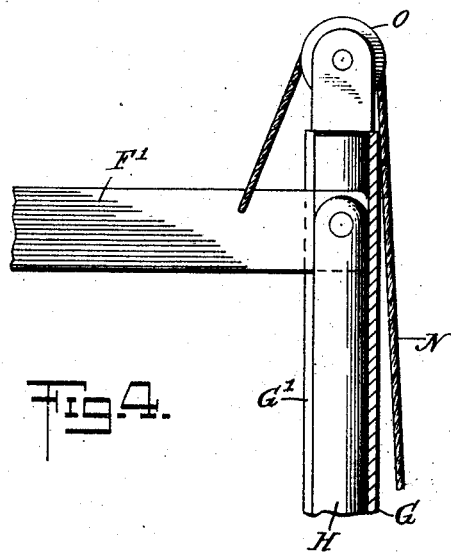
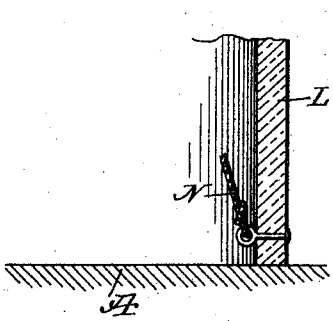
WITNESSES
INVENTOR
William A. McElney
BY
ATTORNEYS W. A. McELNEY.
CHEESE CUTTER.
APPLICATION FILED NOV. 8, 1907.

908,878.

Patented Jan. 5, 1909.
2 SHEETS—SHEET 2.

WITNESSES

INVENTOR
William A. McElney
BY
ATTORNEYS

UNITED STATES PATENT OFFICE.

WILLIAM ARTHUR McELNEY, OF MERIDEN, CONNECTICUT, ASSIGNOR OF ONE-HALF TO JAMES LAWRENCE COIT, OF WATERFORD, CONNECTICUT.

CHEESE-CUTTER.

No. 908,878.   Specification of Letters Patent.   Patented Jan. 5, 1909.

Application filed November 8, 1907. Serial No. 401,198.

*To all whom it may concern:*

Be it known that I, WILLIAM ARTHUR MCELNEY, a citizen of the United States, and a resident of Meriden, in the county of New Haven and State of Connecticut, have invented a new and Improved Cheese-Cutter, of which the following is a full, clear, and exact description.

The object of the invention is to provide a new and improved cheese cutter, for use in stores, hotels, restaurants and other places, and arranged to permit of conveniently and accurately cutting the cheese into pieces of desired sizes, and to normally keep the cheese covered.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 2:
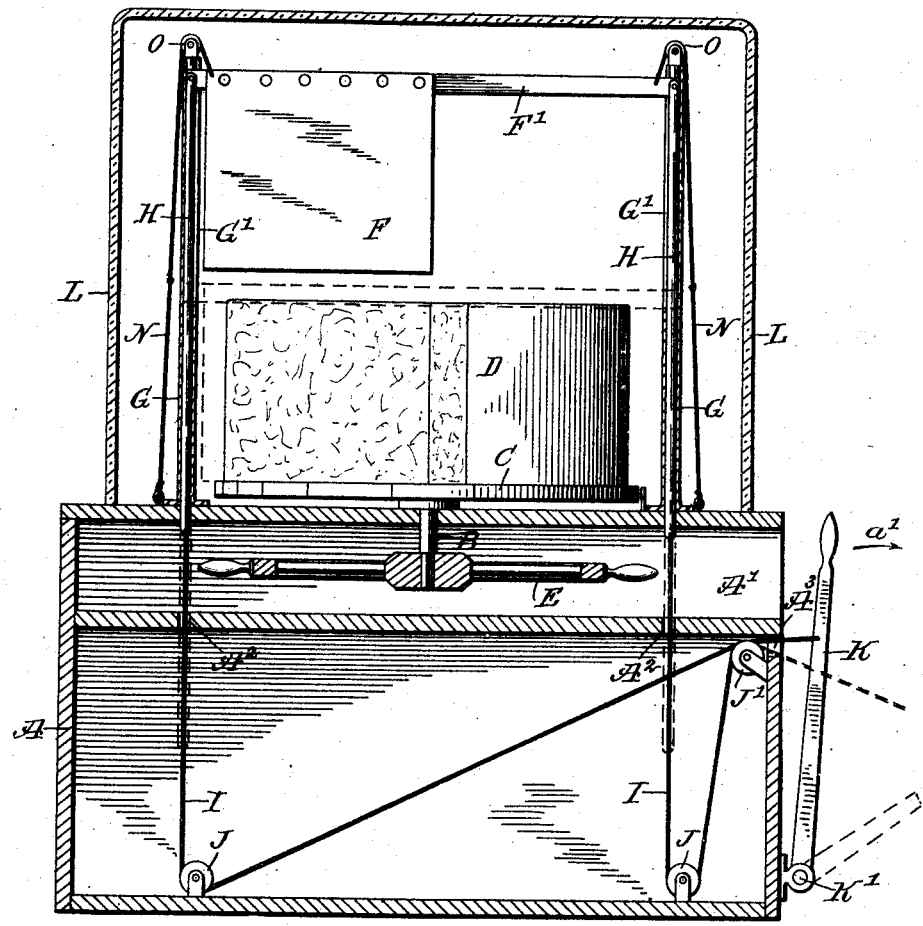
Figure 3:
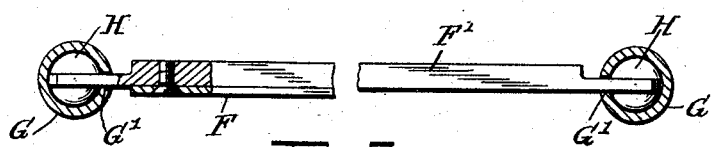

Figure 1 is a perspective view of the improvement; Fig. 2 is an enlarged sectional side elevation of the same; Fig. 3 is a sectional plan view of the cutter and the guideways for the same; Fig. 4 is a sectional side elevation of the same, and Fig. 5 is an enlarged sectional side elevation of part of the cover seated on the base.

The improved cheese cutter is mounted on a hollow base A, in the top of which is journaled a vertically disposed shaft B, carrying at its upper end a platform C for supporting the cheese D to be cut into small pieces. On the lower end of the shaft B is secured a hand wheel E extending within a compartment A' of the base A, and which compartment is open at one side, to permit the operator to conveniently take hold of the hand wheel E and turn the same and with it the platform C and the cheese D held thereon.

The cheese D is adapted to be cut into pieces of desired sizes by a blade F of the cutter, said blade extending radially relative to the platform C and the cheese D held thereon, the lower end and the inner edge of the cutter being sharpened, so as to cut the cheese centrally and radially, as will be readily understood by reference to Fig. 1. The upper end of the blade F is secured to a bar F' extending diametrically of the platform C, and having its ends passing through vertical slots G' formed in guideways G, preferably in the form of tubular posts attached to the top of the base A. The terminals of the bar F' within the guideways G are connected with downwardly-extending rods H, connected at their lower ends with ropes or chains I, passing around guide pulleys J, J, to then connect with a hand lever K, fulcrumed at K' on the outside of the hollow base A. As illustrated in Fig. 2, the ropes I pass through openings A² in the bottom of the chamber A', and which openings are sufficiently large to also accommodate the rods H when the latter are moved into a lowermost position. The ropes I extend through an opening A³ formed in one side of the hollow base A, to then connect with the hand lever K, as previously mentioned.

A cover or a bell L is normally seated on the top of the base A and incloses the platform C, cheese D, cutter F and the guideways G, and the said cover L is connected by ropes N with the bar F' of the cutter, the said ropes N passing over guide pulleys O, journaled in the upper ends of the guideways G. The cover L is preferably made of glass and counterbalances the cutter and the parts connected therewith, so that the cutter blade F and its bar F' and the rods H are normally held in an uppermost position while the cover L is at rest on the top of the base A.

Now when it is desired to make a radial cut in the cheese D, the operator turns the hand wheel E until the lower cutting edge of the cutter F stands in the desired radial relation to the cheese D, and then the operator imparts a swinging motion, through the lever K, in the direction of the arrow $a'$, to cause the ropes I to pull the rods H and consequently the cutter bar F' and the cutter blade F downward, for the cutter blade F to cut the cheese D. During this downward movement of the bar F' and the blade F, a pull is exerted on the ropes N, so that the cover L is raised as the cutter blade F descends, to permit the operator to conveniently remove the cut off piece of cheese D from the platform C. When this has been done, the operator releases the pressure on the lever K, so that the cover L by its own overbalancing weight returns to a lowermost position, thus drawing the bar F' and the cutter F back into an uppermost position.

From the foregoing it will be seen that the cheese cutter is very simple and durable in construction, and can be easily manipulated by the operator to cut off a piece of cheese of a desired size. It will further be noticed that when the device is not used for cutting a piece of cheese, the cover L is in a lowermost position, thus covering the cheese and the cutter, to protect the same against flies, dust and the like.

Having thus described my invention, I claim as new and desire to secure by Letters Patent:

1. A cheese cutter comprising a cutter mounted to slide up and down, a cover for the cheese and connected with the said cutter to normally hold the same in an uppermost position, and manually controlled means connected with the said cutter for imparting a downward sliding movement to the same and simultaneously raising the cover.

2. A cheese cutter comprising a base, a cover for the cheese and normally resting on the said base, a cutter mounted to slide up and down within the said cover, a connection between the said cutter and the said cover for the latter to normally hold the cutter in an uppermost inactive position, and manually controlled means mounted on the said base and connected with the said cutter, for imparting a downward movement to the said cutter and raising the said cover.

3. A cheese cutter comprising a base, a cover for the cheese and normally resting on the said base, a cutter mounted to slide up and down within the said cover, a connection between the said cutter and the said cover for the latter to normally hold the cutter in an uppermost inactive position, manually controlled means mounted on the said base and connected with the said cutter for imparting a downward movement to the said cutter and raising the said cover, and a revoluble platform mounted on the said base for supporting the cheese within the said cover when the latter is at rest on the base.

4. A cheese cutter comprising a base, a cover for the cheese and normally resting on the said base, a cutter mounted to slide up and down within the said cover, a connection between the said cutter and the said cover for the latter to normally hold the cutter in an uppermost inactive position, manually controlled means mounted on the said base and connected with the said cutter, for imparting a downward movement to the said cutter and raising the said cover, and a revoluble platform mounted on the said base for supporting the cheese within the said cover when the latter is at rest on the base, the said platform having a wheel within reach of the operator for the latter to turn the platform to bring the cheese in the desired relation with the said cutter.

5. A cheese cutter comprising a hollow base, a platform mounted to turn on the said base for supporting the cheese, guideways erected on the said base on opposite sides of the said platform, a cutter mounted to slide up and down on the said guideways and extending radially of the said platform, flexible connections secured to the cutter, and a lever connected with the said flexible connections and fulcrumed on the said base.

6. A cheese cutter comprising a hollow base, a platform mounted to turn on the said base for supporting the cheese, guideways erected on the said base on opposite sides of the said platform, a cutter mounted to slide up and down on the said guideways and extending radially of the said platform, the said cutter having rods extending in the said guideways and down into the said hollow base, ropes connected with the lower ends of the said rods, guide pulleys journaled in the said hollow base for guiding the said ropes, and a lever fulcrumed on the outside of the said base and connected with the said ropes.

7. A cheese cutter comprising a hollow base, a platform mounted to turn on the said base for supporting the cheese, guideways erected on the said base on opposite sides of the said platform, a cutter mounted to slide up and down on the said guideways and extending radially of the said platform, flexible connections secured to the cutter, and a lever connected with the said flexible connections and fulcrumed on the said base, a cover normally resting on the said base and inclosing the said platform, the said cutter and the said guideways, and a flexible connection between the said cover and the said cutter.

8. A cheese cutter, comprising a movable cutter, a movable cover for the cheese, and means for simultaneously operating the cutter and raising the cover.

9. A cheese cutter, comprising a movable cutter, means for operating the cutter, a movable cover for the cheese, and means whereby when the cutter is operated the cover will be moved to permit of the cut cheese being removed.

10. In a cheese cutter, a support having guideways, a cutter mounted to slide in the guideways, a cover, a connection between the cover and cutter, whereby the latter is operated by the former, rods secured to the cutter and extending into the guideways, and means connected with the lower ends of the rods for operating the cutter.

In testimony whereof I have signed my name to this specification in the presence of two subscribing witnesses.

WILLIAM ARTHUR McELNEY.

Witnesses:
WM. B. MCELNEY,
LLOYD E. JENNINGS.